(12) United States Patent
Bot

(10) Patent No.: US 8,918,076 B2
(45) Date of Patent: Dec. 23, 2014

(54) REGIONAL ZONE BASED MOBILE CHARGING

(75) Inventor: Johannes Jan Bot, Nieuwendijk (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 674 days.

(21) Appl. No.: 13/123,579

(22) PCT Filed: Oct. 13, 2008

(86) PCT No.: PCT/NL2008/050646
§ 371 (c)(1),
(2), (4) Date: Jul. 6, 2011

(87) PCT Pub. No.: WO2010/044655
PCT Pub. Date: Apr. 22, 2010

(65) Prior Publication Data
US 2011/0263220 A1 Oct. 27, 2011

(51) Int. Cl.
*H04M 11/00* (2006.01)
*H04M 15/00* (2006.01)
*H04L 12/14* (2006.01)
*H04W 4/24* (2009.01)
*H04M 15/30* (2006.01)
*H04M 15/28* (2006.01)

(52) U.S. Cl.
CPC ............ *H04W 4/24* (2013.01); *H04M 15/8044* (2013.01); *H04M 2215/7421* (2013.01); *H04L 12/1432* (2013.01); *H04M 15/8022* (2013.01); *H04M 15/30* (2013.01); *H04M 15/8033* (2013.01); *H04M 15/28* (2013.01); *H04M 2215/74* (2013.01); *H04M 15/80* (2013.01); *H04M 2215/7435* (2013.01); *H04M 2215/745* (2013.01); *H04M 15/00* (2013.01)
USPC ............................. 455/406; 455/455; 455/405

(58) Field of Classification Search
CPC ... H04W 4/24; H04W 8/183; H04M 2215/32; H04M 3/523; H04Q 3/00; H04L 45/00; G06Q 20/10
USPC ................ 455/406, 405, 432.1, 426.1, 404.2, 455/404.1, 412.2, 444, 445, 433; 705/39; 379/223, 265.01, 210.02; 370/351, 406
See application file for complete search history.

(56) References Cited

U.S. PATENT DOCUMENTS

| | | | | |
|---|---|---|---|---|
| 5,699,358 A | * | 12/1997 | Festl et al. | 370/351 |
| 2002/0147002 A1 | * | 10/2002 | Trop et al. | 455/406 |
| 2010/0190492 A1 | * | 7/2010 | Jiang | 455/432.1 |

FOREIGN PATENT DOCUMENTS

| | | |
|---|---|---|
| DE | 197 31 461 C1 | 12/1998 |
| WO | WO 94/28670 A | 12/1994 |
| WO | WO 2008/054194 A | 5/2008 |
| WO | WO 2008/054218 A | 5/2008 |

* cited by examiner

*Primary Examiner* — Charles Appiah
*Assistant Examiner* — Alexander Yi

(57) ABSTRACT

Network node and method in a telecommunication network, the network node receiving from a calling terminal a request to set up a call with a called terminal. The network node retrieves call set up information from a stored connection table and utilizes the retrieved data to set up the call. The connection table comprises data relating to set up of a call between the calling terminal and the called terminal. A first region class for the calling terminal is determined, and a second region class for the called terminal, each being associated with locations of the calling terminal and the called terminal, respectively. Furthermore, a rating category for the call to be set up is determined using the first region class and the second region class using the connection table.

18 Claims, 3 Drawing Sheets

US 8,918,076 B2

REGIONAL ZONE BASED MOBILE CHARGING

TECHNICAL FIELD

The present invention relates to a method and a network node for setting up a call between a calling terminal and a called terminal. in an aspect, the present invention relates to regional zone based mobile charging.

BACKGROUND

International Patent application WO2008/054194 discloses a method for conditionally routing a call made to a fixed telephone number. The call is possibly routed to one or more mobile terminal via an IP network if a mobile terminal is within reach of an access point in the IP network. Alternatively the call is routed to an alternative terminating point, such as an answering machine, using a list stored in a network node implementing the routing service.

International Patent application WO2008/054218 relates to a method of routing a call made by a calling party to a fixed telephone number.

German Patent DBI 9731461 recites a tariff charging method for calls from mobile subscribers in a radio network.

SUMMARY

The present invention seeks to provide an improved call establishment method and a network node implementing such a method.

According to the present invention, a method for setting up a call in a telecommunication network between a calling terminal and a called terminal is provided, comprising receiving from a calling terminal a request to set up a call to a called terminal, retrieving call set up information from a stored connection table, the connection table comprising data relating to set up of a call between the calling terminal and the called terminal, and utilizing the retrieved data from the connection table to set up the call. In a further aspect, a network node is provided in a telecommunication network, the network node receiving from a calling terminal a request to set up a call with a called terminal, the network node being further arranged to retrieve call set up information from a stored connection table, the connection table comprising data relating to set up of a call between the calling terminal and the called terminal, utilizing the retrieved data from the connection table to set up the call. In the connection table, a variety of parameters may be stored which play a role in the set up process of a call between the calling terminal and the called terminal.

In a further aspect there is provided a network node for operating in a telecommunication network, wherein the network node is arranged for establishing a call between a calling terminal and a called terminal, wherein a request for establishing the call is received from the calling terminal, wherein the network node is arranged for retrieving tariff information from a stored connection table, and wherein the tariff information is provided based on locations of the calling terminal and the called terminal, characterized in that the network node is further arranged for retrieving from the stored connection table account information of the calling terminal and the called terminal, wherein the account information comprises one of the group of a prepaid account, a postpaid account and a postpaid to third parties account, and establishing the call utilizing the tariff and account information.

BRIEF DESCRIPTION OF THE DRAWINGS

The present invention will be discussed in more detail below, using a number of exemplary embodiments, with reference to the attached drawings, in which.

DETAILED DESCRIPTION

Figure 1:
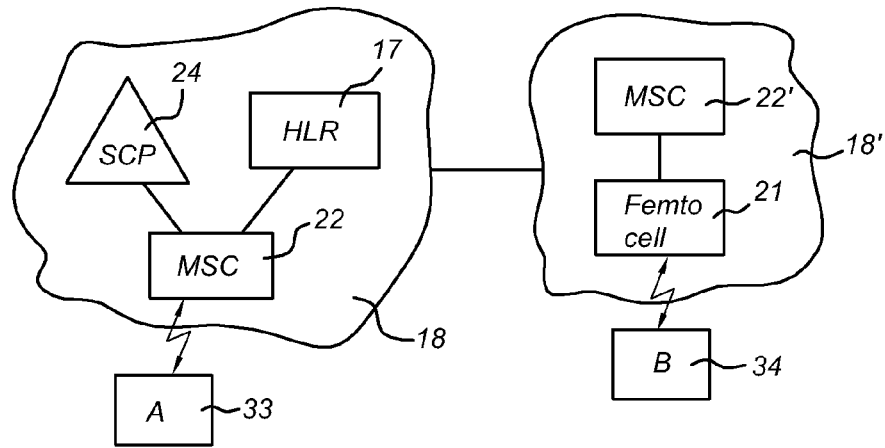
FIG. 1 depicts a schematic view of a telecommunication network employing embodiments of the present invention.
Figure 3:
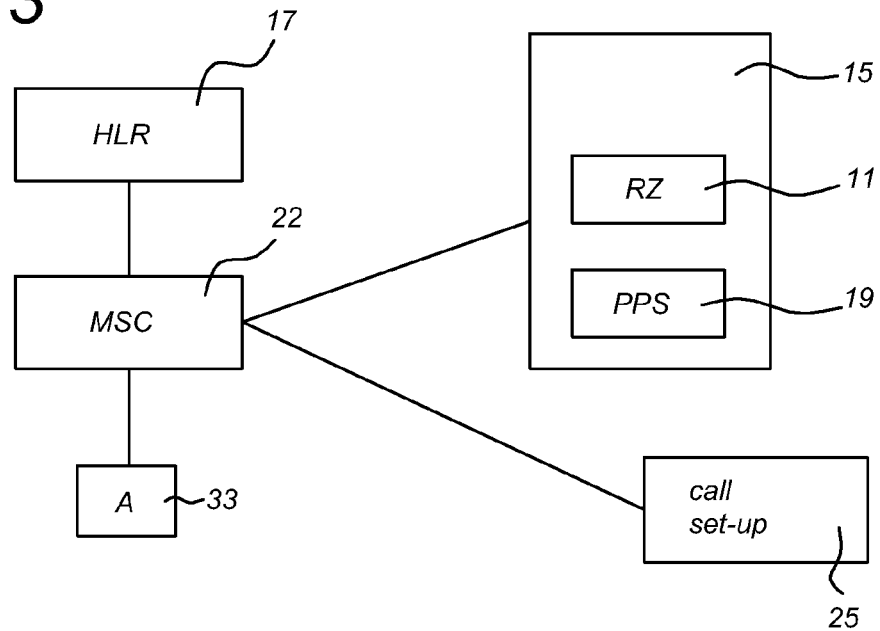
FIG. 3 depicts a schematic view of a part of a telecommunication network in which the present invention embodiments may be implemented.

The present invention relates to the establishment of a call from a calling terminal 33 (a calling party A) to a called terminal 34 (a called party B) in a telecommunication network. This is schematically depicted in the simplified view of FIG. 1. The calling terminal 33 is e.g. a mobile terminal which is served by a (mobile) telecommunication network 18, such as a GSM or UMTS network. The called terminal 34 may also be a mobile terminal, which is served by a second (mobile) telecommunication network 18' which is connected to the telecommunication network 18. In some circumstances, the calling or called terminal 33, 34 may also be arranged to use other types of (wireless) communication, e.g. using an internet protocol (IP) connection by using an Access Point (AP) 10 connected to an IP network 12 (e.g. Wifi, WLAN or WiMax networks), which are in turn interfacing with and in communication with the telecommunication network 18 (See FIG. 3 and the associated description below). In the pending international patent application WO2008/054194 of applicant, which is incorporated herein by reference, embodiments are shown in which a connection between two terminals 33, 34 are set up optionally using an AP 10.

As a further alternative, the calling party 33 or called party 34 may also be served by a femto cell 21, which is like a regular cell in a cellular communication system, but with a more limited range, e.g. inside a building. A femto cell 21 in a GSM network 18' may be connected directly to an MSC 22'. This MSC 22' coupled to the femto cell 21 can be addressed directly by other services or applications being executed in the telecommunication network 18' in a regular manner. In the schematic view of FIG. 1 this is indicated for the called party 34.

Using suitable equipment and arrangements, as known to the skilled person, a call connection may be provided across one or more types of telecommunication networks 18, including but not limited to cellular communication networks (GSM, UMTS), public land based networks (Plain Old Telephone System, POTS), and Voice over IP (VoIP) networks.

In one embodiment of the present invention, a method is provided for setting up a call in a telecommunication network 18 between a calling terminal 33 and a called terminal 34, comprising receiving from a calling terminal 33 a request to set up a call to a called terminal 34, retrieving call set up information from a stored connection table 45, the connection table 45 comprising data relating to set up of a call between the calling terminal 33 and the called terminal 34, and utilizing the retrieved data from the connection table 45 to set up the call. In a further aspect, a network node 15 in a telecommunication network 18 is provided, the network node 15 receiving from a calling terminal 33 a request to set up a call with a called terminal 34, the network node 15 being further arranged to retrieve call set up information from a stored connection table 45, the connection table 45 comprising data relating to set up of a call between the calling terminal 33 and the called terminal 34, and utilizing the retrieved data from the connection table 45 to set up the call.

The calling party 33 and/or the called party 34 may be subscriber to a special service, such as a Regional Zone based mobile charging application. In modern day telecommunication networks 18 this service may be implemented as an Intelligent Network (IN) service. This service may be an application being executed on a separate network node 15 (see FIG. 3) in the telecommunication network 18, or in already present network nodes such as a Service Control Point 24 (SCP) which is in communication with a mobile switching centre 22 (MSC) in a GSM network 18 (which is indicated in the schematic view of FIG. 1).

Nowadays mobile phone calls are charged based on a certain tariff tree, where the calling party 33 will be charged for a certain fee and the called party 34 will be charged for a further fee in case this subscriber 34 is roaming. The tariff of a call is defined in the rating tree and based on a dialed number and a subscription type (pre-paid, post-paid). In known mobile communication systems it is not possible to differentiate the tariff of a mobile phone call based on a region where the calling party 33 and called party 34 are actually located. Roaming subscribers have to pay for receiving a call and in case of a prepaid subscriber as called party 34 the prepaid subscriber is not able to receive phone calls when the prepaid account becomes empty.

Thus, in a further embodiment of the present invention, a method is provided further comprising determining a first region class for the calling terminal, and a second region class for the called terminal, the first and second region class being associated with locations of the calling terminal and the called terminal, respectively, and determining a rating category for the call to be set up using the first region class and the second region class using the connection table. In a further aspect, a network node is provided, the network node being further arranged to determine a first region class for the calling terminal (based on the actual location, e.g. a cell ID), and a second region class for the called terminal, the first and second region class being associated with locations of the calling terminal and the called terminal, respectively, and to determine a rating category for the call to be set up using the first region class and the second region class using the connection table. A region class is e.g. one of a plurality of (geographic) regions, or a roaming location. The rating category may be one of: a free tariff, a local tariff, an inter local tariff, an international tariff. In a further embodiment, the connection table comprises possible rating categories for different combinations of a first region class and a second region class.

According to the present invention, rating information is used in the call set up process, wherein the rating information is based on the location or region of the calling party 33 and called party 34. In this context, region (or zone) relates to a geographical area, e.g. a geographical area covered by a set of cells in a cellular mobile network 18. This also offers the possibility to charge the calling party 33 for the roaming costs of the B-subscriber (called party 34).

Figure 2:
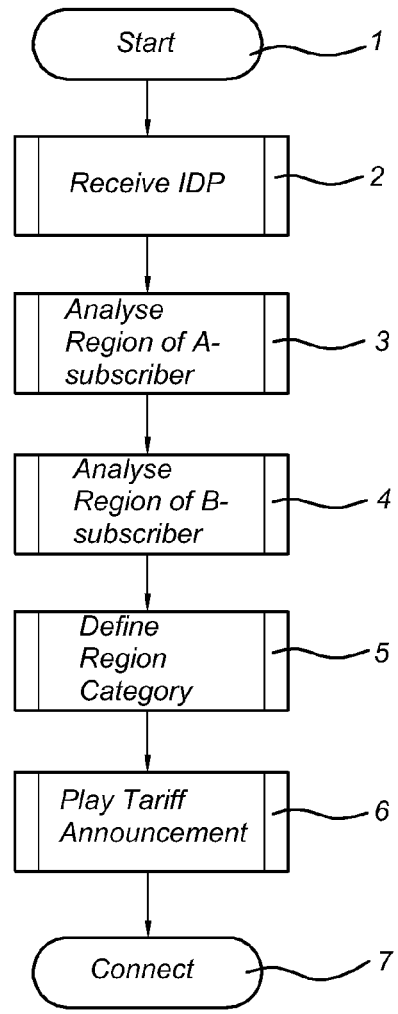
FIG. 2 depicts a flow diagram of a method embodiment of the present invention.

In one embodiment of the present invention, a connection table 45 is used by an Intelligent Network (IN) service implementing the regional zone based mobile charging application (RZ service 11), wherein the application is being executed in an SCP 24 of the mobile communication network 18 and the connection table is stored in the SCP 24. In FIG. 2 a flow chart is shown of this embodiment.

Based on Originating Subscription Information as received by the MSC 22 serving the calling party 33, an IN service will be triggered and started in the SCP 24 (step 1 in FIG. 2). After invocation of the service, the location (cell ID) of the calling party 33 (received by the SCP 24 as part of the Initial Detection Point (IDP), step 2) is analyzed and mapped towards a region class (step 3).

Then the region information (i.e. location) of the called party 34 is defined using e.g. an Anytime Interrogation (ATI) message towards a home location register (HLR) 17 associated with the specific communication network 18 serving the called party 34. The Cell ID of the B-number (i.e. which cell of the communication network 18 is currently serving the called party 34) will be returned and this cell ID will be mapped to a region class (step 4). Then the IN SCP 24 will analyze the two region classes and map this combination to a rating category (step 5). Optionally, the calling party 33 will be informed about the tariff of the call (step 6) and the calling party 33 will get the option to pay for the call in case e.g. the called party 34 is roaming. After receiving a reply from the calling party 33, the call is set up in a regular manner (step 7: indicated in FIG. 3 as a functional block 25 'call set-up' connected from the MSC 22).

The rating category as determined may be transmitted to a billing service in the telecommunication network 18. Such a billing service is a regular service in a telecommunication network 18 which functions to bill the correct cost to the users of the telecommunication network 18. The network node 15 implementing the present regional zone service may interface with the billing service in the telecommunication network 18.

It is possible to define the following rating categories as part of the connection table stored in the SCP 24, depending on the region classes as determined for the calling party 33 and called party 34:

| Region Class A-party | Region Class B-party | Rating in case A pays for roaming costs B | Rating in case A doesn't pay for Roaming B |
|---|---|---|---|
| Region 1 | Region 1 | Free | Free |
| Region 1 | Region 2 | Local Tariff | Local Tariff |
| Region 1 | Region 3 | Interlocal tariff | Interlocal tariff |
| Region 1 | Roaming location | International tariff 1 | Interlocal tariff |
| Roaming location | Region 3 | International tariff 1 | International tariff 1 |
| Roaming location | Roaming location | International tariff 2 | International tariff 1 |

In a further embodiment of the present invention, the called terminal 34 is associated with a prepaid account, and the network node 15 is further arranged to send a message to the calling terminal 33 requesting a payment option for the call to be set up to the called terminal 34. This enables the user of the calling terminal 33 to pay for the cost of the call to called terminal 34. The choice of the calling terminal 33 may be stored in the connection table 45. Furthermore, it is possible that the message has the form of a tariff announcement communicated to the calling terminal 33.

The network node interfaces with a prepaid service 19 in the telecommunication network 18 in an even further embodiment, and the network node 15 is further arranged to invoke the prepaid service 19 after determining a rating category, and to include the rating category (and possibly a terminating tariff deduction parameter) in a message transmitted to the prepaid service 19.

The prepaid service (PPS) 19 will be invoked after invocation of the RZ service 11, i.e. as part of the connect step 7 in the flow chart of FIG. 2. The PPS 19 is e.g. a software module being executed in a network node 15, possibly the same network node 15 in which the RZ service 11 is being executed as depicted schematically in FIG. 3. The Regional Zone service 11 sends a Connect message with a PPS invocation prefix added to the called party number as destination routing address. The payment service (an application being executed in a (further) network unit of the communication network 18) would then be triggered based on that PPS Invocation prefix. As an option, the prepaid service 19 might be invoked using route based triggering, which as such is known to the skilled person.

The parameter 'Region Class' as defined above will be transferred to the PPS service 19. Also a 'Terminating Tariff Deduction' parameter may be added in a further embodiment indicating that the calling party 33 will be charged for the call and the terminating party or called party 34 receives this call for free (in case of roaming). Note that a third party prepaid system can be part of the solution.

For manufacturers of network equipment (including software modules) it is possible to offer mobile operators advanced region based charging services using the above described embodiments. For operators a service may be provided to the end user that extends the usage of mobile phones and a higher call success rate. For the customer a simple routing service is provided that extends the mobility of the end-user. Clear and up-to date tariff information is provided, as well as a possibility to reach a roaming subscriber that has no credit on the associated prepaid account.

In a further aspect, the present invention relates to a method wherein the connection table comprises routing information for a called terminal, the routing information comprising an indication whether or not a called terminal is reachable via a second network (e.g. an internet protocol (IP) network) in communication with the telecommunication network, and the method further comprises retrieving routing information from the connection table, and when the called terminal is reachable via the second network, setting up the call via the second network. Similarly, the present invention may relate to a network node wherein the connection table comprises routing information for a called terminal, the routing information comprising an indication whether or not a called terminal is reachable via a second network in communication with the telecommunication network, the network node being arranged to retrieve routing information from the connection table and when the called terminal is reachable via the second network, to set up the call via the second network.

Figure 4:
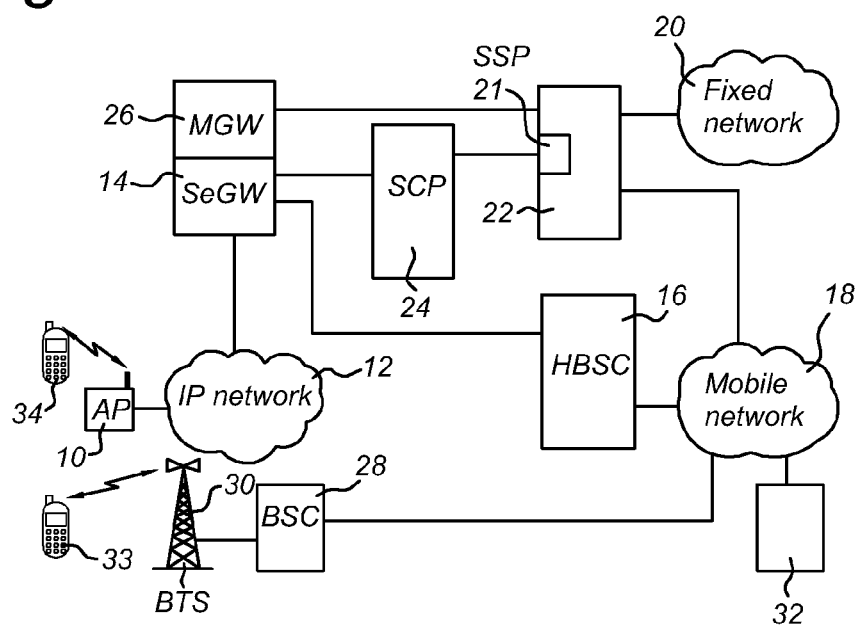
FIG. 4 depicts a further schematic view of telecommunication networks in communication with each other, in which embodiment of the present invention may be implemented.

In FIG. 4, a network diagram is shown which depicts a telecommunication network in which embodiments of the present invention may be implemented. The telecommunication network comprises a wireless access point 10, such as a WiFi enabled modem installed at a subscriber's premises, which is connected to an Internet Protocol (IP) network 12. A number of further elements allow the IP network 12 to interface with a fixed telephony network 20 and/or a mobile telephony network 18, i.e. a Security Gateway (SeGW) 14 and a Media Gateway (MGW) 26. The MGW 26 and SeGW 14 (which can also be seen as a single entity or network node) provide the interface between IP network 12 and general elements of a telecommunication network, i.e. a telephony switch 22, a Service Control Point (SCP) 24 and a Home Base Station Controller (HBSC) 16. These general elements may be formed by units which are part of or associated with the mobile telephony network 18 and/or fixed telephony network 20. E.g. when being part of the mobile telephony network 18, the switch may be formed by an MSC 22. Furthermore, as part of the mobile telephony network 18, a Base Station Controller (BSC) 28 and a Base Transmission Service (BTS) 30 are provided, which form the air interface with a mobile terminal 33.

In the embodiment shown in FIG. 4, a Service Switching Point (SSP) 21 is arranged in the telephony switch 22 (or MSC). A database, not shown, is arranged for comprising information needed by the SCP 24 for routing purposes. The database may be arranged in the SCP 24, as a separate database like a Service Data Point (SDP), or arranged in another node or processing unit which is able to communicate with the SCP 24.

In FIG. 4, mobile terminals 33, 34 are depicted which are arranged to communicate either via said wireless access point 10 or said BTS 30. An example of such a mobile terminal 33, 34 is a UMA/GAN capable handset which is presently available on the market.

The Security Gateway 14 is arranged to setup a secure tunnel through the IP network 12 via the access point 10 to the mobile terminal 34 (IP-SEC).

The HBSC 16 is arranged to register alternative access possibilities of UMA/GAN subscribers, and e.g. also to register when a mobile terminal 34 is connected via the access point 10. This may be stored in a connection table 45 which is accessible to the SCP 24 (or another network node executing a service related to the set up of a call). The HBSC 16 communicates with the mobile telephone network 18 using the Mobile Application Protocol (MAP), and at the other end it communicates with the SeGW 14. The mobile telephone network 18 is arranged for providing telecommunication services for GSM and/or UMTS subscribers. It should be noted that in FIG. 3 the telephony switch 22 is depicted separate from the fixed telephone network 20 and mobile telephony network 18, while in fact it can be seen as being part of the fixed or mobile telephone network 18, 20. The SCP 24 is an IN node that is capable of executing IN services. This IN node in one embodiment provides an implementation of an application allowing the subscribers to be called to their fixed telephone number while receiving the calls on a mobile phone (Route to Mobile service (RTMS)), as described in more detail in pending international application WO2008/054194 mentioned above.

The SSP 21 in the telephony switch 22 triggers the SCP 24 whenever a connection needs to be set up to the fixed number. To set up a connection, at the signalling level, a phone number is transmitted via the network. There are three basic ways the SSP 21 can select which called numbers to forward to the SCP 24. First is known as "all B or all query" In this case the SSP 21 will forward every called number to the SCP 24. Alternatively the SSP 21 comprises a list of phone numbers for which the SSP 21 does not directly connect the call to the destination, but first accesses the SCP 24 to check whether the final destination is correct. Instead of the called number also the range in which the called number is or the subscription class of the called number may be used. If for example, a called party 34 has forwarded all the calls to another number, the SSP 21 will ask the SCP 24 for every call to which number the call needs to be connected.

The SSP 21 will receive the correct number from the SCP 24 and will establish a connection to the correct number. Please note that the term 'number' is not necessary the same as telephone number. A voice mail box 32 associated with a telephone number (e.g. a mobile number associated with the mobile telephony network 18) will have in the network a different 'number' than the telephone number.

The SSP 21 will receive the request for setting up a connection from the network, and then the SSP 21 gives the request as a "Initial DP" message to the SCP 24.

The telephony switch 22 communicates with the MGW 26, the fixed telephone network 20, and with the mobile telephone network 18 using the ISDN User Part for controlling the routing of the call and time division multiplexing (TDM) for the actual voice path. The SSP 21 in the telephony switch 22 communicates with the SCP 24 using the INAP (Intelligent Network Application Part) protocol. The MGW 26 is arranged to convert VoIP traffic received from the IP network 12 to TDM traffic for the telephony switch 22. The MGW 26 communicates with the IP network 12 using the well known Session Initiation Protocol. The BSC 28 communicates to the mobile telephone network 18 (i.e. a Mobile Switching centre in said mobile telephone network 18) using the so-called Base Station System Application Part (BSSAP) protocol. The SeGW 14 communicates with the IP network using IP packets. It is noted that other protocols may be used as will be clear to the skilled person.

Figure 5:
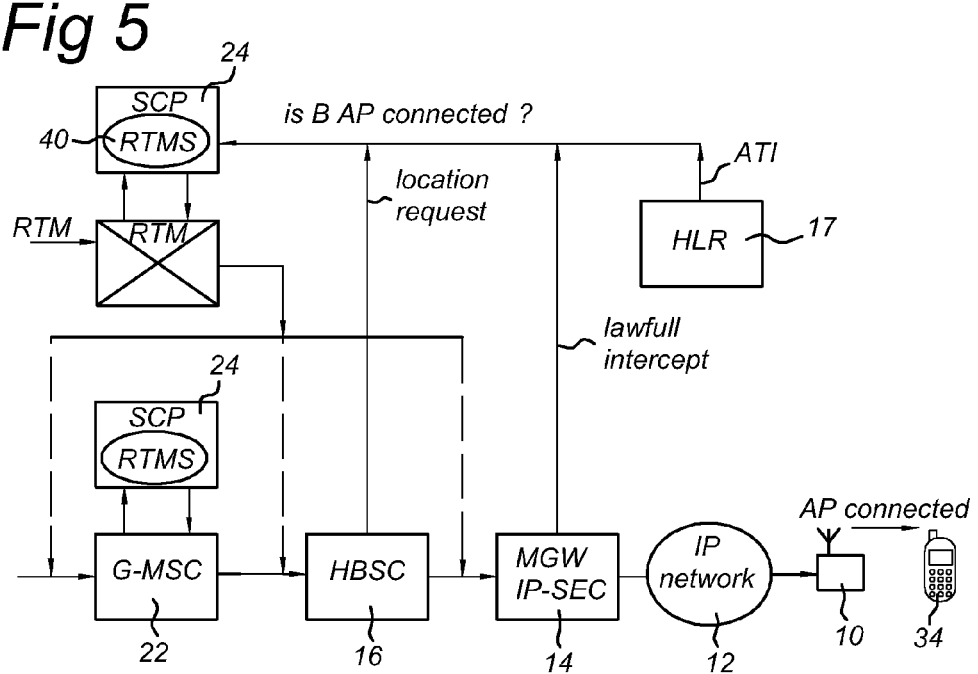
FIG. 5 depicts a schematic views of an embodiment of the present invention relating to possible routes to a called terminal within reach of an access point.

As described earlier a B party's mobile 34 registers to a HBSC 16 when getting in contact with a WLAN/WIFI transmitter (access point 10). The HBSC 16 contacts the HLR 17 associated with the mobile telephony network 18 to get full details of the called party (B) 34. At the same time the HLR 17 is informed that the called party (B) 34 can now also be reached via the HBSC 16. This is comparable to a V-MSC (visited MSC) operation when the called party (B) 34 roams into the coverage area of the V-MSC. The HLR 17 holds now two alternatives for reaching the called party (B) 34, i.e. the HBSC 16 and the V-MSC. When the route to mobile service (RTMS) want to establish the connection to the called party (B) 34 it requires doing an ATI (Anytime Inquiry) of the HLR 17 to obtain the HBSC 16 of the called party (B) 34 as an indication that the called party (B) 34 is WLAN/WIFI connected. Then it has three basic options to route the call to called party (B) 34, as indicated in the schematic diagram of FIG. 5.

Forward the call to the G-MSC 22 associated with called party (B) 34. In this case a special prefix needs to be added to the MSISDN of called party B to cause the G-MSC 22 to route to the HBSC 16 instead of the V-MSC. As an alternative the G-MSC 22 is configured to select always the HBSC 16 route when available. This may e.g. be stored in the connection table 45 as stored in the SCP 24.

Second possibility is direct routing to the HBSC 16. In this case no prefix is required. Again the needed information may be obtained from the connection table 45 as stored in the SCP 24.

Third possibility is to route to the media gateway MGW 14. In this case RTMS requires interrogating the HBSC 16 for further details on the MGW 14 to use (or a fixed MGW 14 is used and this step can be omitted). Then RTMS requires to use the lawful intercept interface of the MGW 14 to obtain further details for the connection with called party (B) 34, before forwarding the call to the MGW 14.

The Route To Mobile Service (RTMS) may be implemented in a communication network 18 (e.g. implemented in an SCP 24) in a further embodiment, in which a connection table is used as source of information on how to connect various calling parties 33 to called parties 34.

Figure 6:
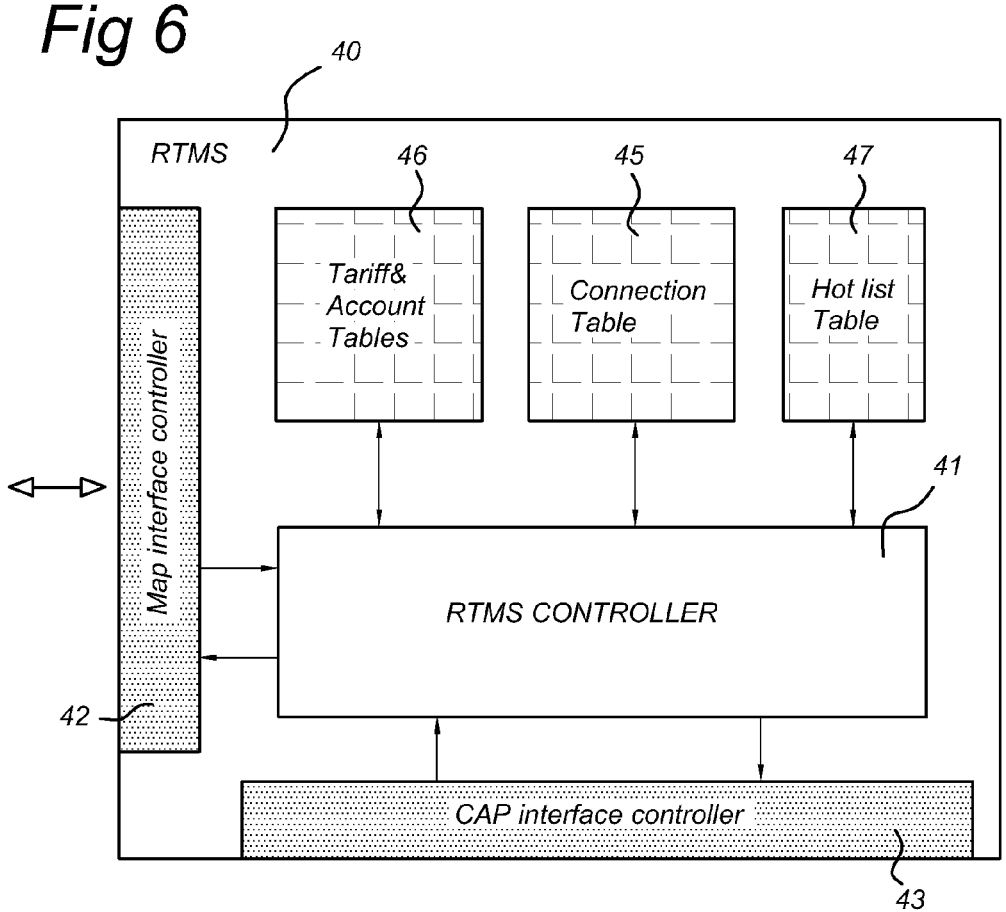
FIG. 6 depicts a schematic view of an implementation of a route to mobile service network node using a connection table according to an embodiment of the present invention.

A schematic diagram of an RTMS 40 implementation, with functional interfaces is shown schematically in FIG. 6. The MAP interface controller 42 allows the RTMS (i.e. the RTMS Controller function 41) to exchange MAP messages with other entities like the HLR 17. The CAP interface controller 43 allows the exchange of CAP messages with entities/network nodes like the MSC 22.

Furthermore, the RTMS controller 41 is arranged to interface with three types of tables 45-46-47. In one embodiment, the tables are combined into a single table, which in this and other embodiments may be referred to in general as connection table 45.

The connection table 45 holds records for each RTM subscription managed by the RTMS 40. For each RTM number a group of records exists identified as a RTM group. Each record in the group contains the RTM number as well as a connection number to connect to when the RTM number is called. All these connection numbers form a hunting list.

A connection number can be the MSISDN of a RTM subscriber (e.g. calling party 33), again a RTM number or a non RTM subscriber number. To identify if the stated connection number is subject to RTM control (is a RTM subscriber) a Subscriber flag is contained in each record.

The hierarchical set-up allows for example companies to have one general RTM number and several dedicated RTM numbers like for the sales department, service department, and purchase department. The dedicated RTM numbers are present as connection number in the general RTM number of the company. The general RTM group also contains records having the numbers of the central reception as connection numbers.

The subscriber flag is one of several RTM control flags present in each record. Several others will be discussed hereafter. Control flags may be related to the RTM group or to one record (connection number). In the first case each record of the RTM group has the same value in the flag, in the second case the value may differ per connection number.

The tariff & account table 46 contains the details on where and how to charge the call cost for the different call cases. For each RTM subscriber 33, 34 a table 46 is present. An example of such a tariff & account table 46 is given below;

EXAMPLE TABLE TARIFF & ACCOUNT SELECTION

| | Calling A = RTM | A loc. | A account | leg 1 + 2 Tariff | Called B = RTM | Same client | B. loc | B account | Third leg Tariff |
|---|---|---|---|---|---|---|---|---|---|
| 1 | Y | IN | A1 | T1 | Y | Y | IN | A1 | Tb1 |
| 2 | Y | IN | A1 | T1 | Y | Y | H-P | A1 | Tb2 |
| 3 | Y | IN | A1 | T1 | Y | Y | V-P | Ax | n.a.* |
| 4 | Y | IN | A2 | T1 | Y | N | IN | A2 | Tb1 |
| 5 | Y | IN | A2 | T1 | Y | N | H-P | A2 | Tb2 |
| 6 | Y | IN | A2 | T1 | Y | N | V-P | Ax | n.a.* |
| 7 | Y | IN | A3 | T1 | N* | | | No action | |
| 8 | Y | H-P | A1 | T2 | Y | Y | IN | A1 | Tb1 |

EXAMPLE TABLE TARIFF & ACCOUNT SELECTION

| | Calling A = RTM | A loc. | A account | leg 1 + 2 Tariff | Called B = RTM | Same client | B. loc | B account | Third leg Tariff |
|---|---|---|---|---|---|---|---|---|---|
| 9 | Y | H-P | A1 | T2 | Y | Y | H-P | A1 | Tb2 |
| 10 | Y | H-P | A1 | T2 | Y | Y | V-P | Ax | n.a.* |
| 11 | Y | H-P | A2 | T2 | Y | N | IN | A2 | Tb1 |
| 12 | Y | H-P | A2 | T2 | Y | N | H-P | A2 | Tb2 |
| 13 | Y | H-P | A2 | T2 | Y | N | V-P | Ax | n.a.* |
| 14 | Y | H-P | A3 | T2 | N* | | | No action | |
| 15 | Y | V-P | Ax | n.a.* | Y | Y | IN | A1 | Tb1 |
| 16 | Y | V-P | Ax | n.a.* | Y | Y | H-P | A1 | Tb2 |
| 17 | Y | V-P | Ax | n.a.* | Y | Y | V-P | Ax | n.a.* |
| 18 | Y | V-P | Ax | n.a.* | Y | N | IN | A2 | Tb1 |
| 19 | Y | V-P | Ax | n.a.* | Y | N | H-P | A2 | Tb2 |
| 20 | Y | V-P | Ax | n.a.* | Y | N | V-P | Ax | n.a.* |
| 21 | Y | V-P | Ax | n.a.* | N* | | | No action | |
| 22 | N | | not relevant | | Y | n.a. | IN | A3 | Tb1 |
| 23 | N | | not relevant | | Y | n.a. | H-P | A3 | Tb2 |
| 24 | N | | not relevant | | Y | n.a. | V-P | Ax | n.a.* |
| 25 | N | | not relevant | | N* | | | No action | |

The tariff & account table 46 consists of rows, each row is defined by the RTM subscription (Yes/No) and location (e.g. connected via AP 10 to IP Network (IN), mobile connected in the H-PLMN (H-P) or mobile connected in a V-PLMN, i.e. roaming (V-P)) of the calling party (A) 33 and the called party (B) 34.

A further distinction is made by the same client field. When both calling party A 33 and called party B 34 are RTM subscribers and belong to the same RTM group charging can be different. This will allow companies to have different charging for inter-company calls. The account has to be seen as a number that is charged. This can be prepaid (is MSISDN of terminal+prefix), postpaid (MSISDN of terminal) or postpaid to a third party number. The later allows a company to accumulate all cost into one account and receive a single bill.

The RTMS 40 fetches the table based on the RTM subscription indicator in the connection record and the connection number. RTMS 40 can be invoked by the MSC 22 of the calling party 33 when the associated parameters are set in the HLR 17 for triggering RTMS 40. The service 40 will then fetch the table belonging to the calling RTM subscriber 33 and use account and tariff in the calling party 33 part of the table 46. Likewise it can be done by the G-MSC 22 when T-CSI (or TICK) is set in the HLR 17 in the subscription details of the mobile terminal 34 that is called directly. Then the table 46 is fetched for the called MSISDN 34 and the tariff and account in the called part is used. Third possibility is when a RTM number is called then the RTM switch will invoke RTMS 40 on basis of number recognition. The table 46 will be fetched for a B MSISDN (called party 34 number) that is used for trying to get connection. Alternative here is that the tables for all connection numbers (being RTM subscribers) in a RTM group have the same called part tariff and accounts in their tables. If parallel ringing is used this is mandatory.

A connection between a calling party 33 and a called party 34 consists of three basic parts. If the calling party 33 is a mobile party then the first part is the connection between the mobile terminal 33 and the MSC 22. The second part is the connection between the MSC 22 and the final destination switch in the network 18 (or IP network 12). The third part is the connection between the final destination switch and the terminal 34 of the called party. If the called party terminal 34 is a fixed line telephone the final destination switch will be a local exchange 22. If a RTM number was called the final destination would be the RTM switch 22. If the called number is a MSISDN then the final destination is a G-MSC 22. A standard approach is that the calling party 33 pays for the first two parts and the called party 34 pays for the third part. When both terminals 33, 34 are RTM subscribers also other arrangements on who pays which cost can be made.

Account and tariff information is returned after the invoking CAP-IDP message by means of a Furnish Charging Information (FCI) message sent with the CAP-CON message. The Furnish Charging Information (FCI) message will be used by the receiving MSC 22 to modify charging records.

The Hot list table 47 comprises records where each record contains a called party 33 MSISDN and a telephone number that is allowed to bypass the RTMS 40. When entries for a MSISDN exist in the hot list table then a hot list indicator flag in the connection record in connection table 45 for that MSISDN is set. When a direct call to a RTM subscriber 34 is made the RTMS 40 checks when invoked if any of the records having the MSISDN if the phone number in those records match the calling phone number. If a match exists then all other limitations in the connection record are ignored and a connection is set-up. Likewise, when invoked for a calling RTM subscriber 33, a match of the called phone number and the phone numbers in the records having the MSISDN of the calling party will have the same effect that limitations for setting up the connection in the connection record of the calling RTM subscriber are ignored.

In case of an implementation of RTMS as application in a SCP 24, the tables may also be located in a SDP (Service Data Point).

As indicated a RTM group contains one or more records with connection numbers. When there is an incoming call for the RTM number of the RTM group then a hunting process is executed by the RTMS 40 to establish a connection using the hunting list as described above. The hunting process is, in a further embodiment, supported by a Priority Number in each record of the RTM group. Zero (0) is the highest priority and the first connection attempt will be made to that number. If no answer or busy the connection number with Priority number one (1) is taken, and so on. Records within a RTM group may contain the same priority number. In that case these will be subject to parallel ringing when such is supported by the CAP version used. The CAP version applicable is contained in a special field in CAP-IDP messages. If not supported then the connection number with equal priority are tried one by one in the order as received from the connection table 45.

Accordingly, in an embodiment of the present invention, the connection table comprises a hunting list for a called terminal, the hunting list comprising one or more destination addresses to which the call can be set up, and a priority indicator for each of the one or more destination addresses. The destination address may be an IP address, an alternative IP address, and alternative mobile address, or even addresses to reach alternative services, such as an answering service.

In further embodiments, the network node is arranged to apply a set of rules to data obtained from the connection table. These data may comprise one or more flags which can be set by the user (i.e. users of calling terminal 33 and/or called terminal 34), e.g. based on subscription to various services offered by the operator of the telecommunications network. Examples of such flags include, but are not limited to a subscriber flag, hot list indicator flag, CLI conversion flag, force to Route To Mobile flag, RTM locked flag, etc.

When a RTM subscriber A 33 makes a call his MSISDN will be used as calling line identity. In some circumstances this is not wanted. In case the called party B 34 uses a service like automatic call back when busy or on no answer, the reverse call will be setup directly to the mobile number instead of the RTM number. The same happens when the called party 34 stores the number and later on makes a call using the stored number. It is therefore important that the RTM number is given as calling line identity instead of the MSISDN.

The conversion should however not take place in all cases. If for example calling and called party belong to the same RTM group, the called party would like to see who of his group is calling him. This might be by the MSISDN or by a short number of the calling party.

In order for RTMS 40 to control the CLI in the subscription of calling party A 33 contained in the HLR 17, the Originating Subscription Information parameter field (O-CSI or OICK) should contain a trigger to invoke RTMS 40. When a call is made, first RTMS 40 is invoked before the call setup continues.

The conversion of CLI could be done by a fixed rules in RTMS 40 but as it might also differ per RTM group. CLI conversion is set as a flag in the connection table 45. When invoked, RTMS 40 retrieves the record from the connection table 45 for the group where calling party A 33 belongs to. If the flag is set then RTMS 40 places the RTM number of the group in the additional calling party number filed When changed RTMS 40 sends a CAP-CON message containing the modified fields to the MSC 22. The MSC 22 will use the value of these fields for the continuation of the set-up of the call. The called party 34 is presented the RTM number as CLI.

When the called party 34 is also a RTM subscriber (known from the connection table 45) then RTMS 40 will also be invoked due to the use of the RTM number. If this is the case and calling party A 33 and called party B 34 belong to the same group then the RTM group may contain a second flag in the connection table 45 that instead of the RTM number the original MSISDN of calling party A 33 or a short number representation of calling party A 33 is to be used. For the original MSISDN, RTMS 40 simply removes the contents of the additional calling party field. For short number representation, RTMS 40 replaces the RTM number in the additional calling party number by the short number representation.

In the standard situation a party 33 can call the MSISDN of called party B 34 and so bypass the RTM system and get direct mobile connection with called party B 34. If called party B 34 is not connected to an AP 10 then the route via a V-MSC is used. Especially companies would require that calls are always subject to RTM control. This is achieved by placing a trigger to RTMS 40 in the T-CSI or as alternative TICK field in the subscription of called party B 34 in the HLR 17. When a call to the MSISDN of called party B 34 is made the call set-up reaches the G-MSC 22 for called party B 34. Here the G-MSC 22 fetches the details of called party B 34 from the HLR 17. Forced by the contents of the T-CSI or TICK field the G-MSC 22 invokes with a CAP-IDP message RTMS 40 in the SCP 24.

As forcing to RTM might only be applicable for some and not all RTMs a force to RTM flag is available in the connection table 45. When RTMS 40 is invoked it retrieves the record matching the MSISDN of called party B 34 that was called. If the flag for forcing to RTM is set, RTMS 40 replaces the MSISDN of called party B 34 in the called party field with the RTM number. The original MSISDN of called party B 34 is placed in the original called party ID field. Then RTMS 40 returns the modified fields in a CAP-CON message to the G-MSC 22.

The G-MSC 22 then forwards the call to the RTM number instead of the MSISDN of called party B 34. The call set-up arrives at the RTM switch, RTMS 40 is invoked and will perform the normal RTM functions. As an option RTMS 40 may check if the Original called party ID was containing an MSISDN. In that case it may use this MSISDN as first priority in hunting.

As an A party 33 can have a MSISDN that is coupled to more then one RTM group, the RTM group to apply can not be established. Example for such a case is a person using his mobile phone for his private RTM as well as the Company RTM. To be able to select the correct record in the connection table 45 in calling cases, a RTM locked flag is contained in the record. RTMS 40 checks in calling cases the presence of this flag. Only the one RTM record that has the flag not set shall be used.

The A party 33 has the possibility to change his default RTM by means of a service call or service SMS. Example of such; *666*"RTM number" send. The service call or SMS will arrive at RTMS 40, which will set the flag in all records of the connection table 45 matching the MSISDN of the A party 33. Then only one flag is reset in the record matching the A party 33 MSISDN and the RTM number. Other examples of connection control flags which are settable by RTMS 40 in the connection table 45 include, but are not limited to: Blocking of calls to non RTM numbers, Blocking of calls outside the own RTM group, Blocking of calls when self not AP 10 connected, Blocking of calls when self not in H-PLMN, . . . .

In an even further embodiment, the present invention relates to a method wherein the connection table further comprises a route to mobile (RTM) group identification and an announcement indicator associated with a called terminal, and the method further comprises sending a message (in the form of a ring tone or a textual announcement) to the called terminal prior to call establishment based on the announcement indicator. Furthermore, a network node may be provided wherein the connection table further comprises a route to mobile (RTM) group identification and an announcement indicator associated with a called terminal, and the network node is further arranged to send a message to the called terminal prior to call establishment based on the announcement indicator.

A further addition in the connection table 45 is made in a further embodiment, in which an RTM group announcement is sent to the called party 34. The called party 34 can be informed if the incoming call is from a party that is also an RTM member. The called party 34 has two selection options in the connections table 45, one for a dedicated ring tone and one for prior announcement before connect. For the ring tone the following selections can be made: no ring tone, only for members of the same RTM group or in the same main RTM group, or for all RTM parties calling. Like wise options for receiving a RTM group identification can be set in the connection table 45 prior to the actual connection of the call for all RTM parties calling, only for RTM parties outside his own (main) RTM group or no prior announcement. Where the ring tone is determined by the called party 34, the announcement is determined by the calling party 33 like a personal greeting (e.g. the name of the company). The reference to the stored announcement is also saved in the RTM member record in the connection table 45 in a further embodiment. Optional this greeting can be locked, and is automatically inherited from a higher order RTM group to which this RTM member belongs.

The announcement is possible from CAP V2 onwards. A dedicated ring tone is only possible in conjunction with call state handling under CAP V4. For a CAP V2 implementation the ring tone must be part of the announcement as discussed below. Note that the user will get the announcement after accepting an incoming call but it is possible to disconnect before the actual call connection is made.

For playing an announcement the SCP 24 will sent a CAP-PA message (play Announcement) with the indication of the prerecorded message, prerecorded tone, a combination of prerecorded tones and messages, a text string that is converted into speech, or a variable message containing several of the before described elements. When the announcement is completed the SSF in the MSC 22 informs the service in the SCP 24 thereof by a CAP-SSR (Specialized Resource Report). Then the SCP 24 sends CAP-CON for actual connecting the call. If a called party 34 disconnects before that the call will not be established or established in an alternative way as controlled by the service in the SCP 24.

The invention claimed is:

1. A method of establishing a call in a telecommunication network between a calling terminal and a called terminal, wherein a request for establishing said call is received from said calling terminal, said method comprising the steps of:
   retrieving tariff information from a stored connection table, wherein said tariff information depends on locations of said calling terminal and said called terminal;
   retrieving from said stored connection table account information, the account information identifying which of a plurality of accounts is to be charged for the call, the plurality of accounts including:
      a prepaid account of one of a first party associated with said called terminal and a second party associated with said calling terminal,
      a postpaid account of one of said first and second parties, and
      a postpaid account of a third party other than the first and second parties,
   wherein said called and calling terminals are subscribers of a Route to Mobile service (RTMS) and said account information depends on whether said called and calling terminals belong to a same group of RTMS subscribers, and
   establishing said call utilizing said tariff and account information,
   wherein, when the RTMS is triggered based on parameters in a HLR, said call is established using a hunting list, said hunting list comprising one or more destination addresses to which said call can be set up and a priority indicator for each of said one or more destination addresses, and
   wherein when the RTMS is not triggered, said call is established in a direct connection with the called terminal.

2. The method according to claim 1, wherein at least one of said calling terminal and said called terminal is a subscriber of a service arranged for executing said steps in said telecommunication network.

3. The method according to claim 1, wherein said tariff information depends on whether said calling terminal and said called terminal belong to a same group of RTMS subscribers.

4. The method according to claim 1, wherein said connection table comprises an RTMS group identification and an announcement indicator associated with said called terminal, and said method further comprising a step of sending a message to said called terminal prior to call establishment based on said announcement indicator.

5. The method according to claim 1, wherein said tariff information is provided by determining a first region class for said calling terminal and a second region class for said called terminal, said first region class being associated with a location of said calling terminal and said second region class being associated with a location of said called terminal and determining a rating category for said call to be set up using said first region class and said second region class for retrieving said tariff information from said stored connection table.

6. The method according to claim 5, wherein based on said rating category a calling party associated with said calling terminal is charged for roaming costs of a called party associated with said called terminal.

7. The method according to claim 1, further comprising the step of, if said account information identifies the account of said called terminal as a prepaid account, sending a message to said calling terminal requesting a payment option for said call to be set up to said called terminal.

8. A network node for operating in a telecommunication network, wherein said network node is arranged:
   for establishing a call between a calling terminal and a called terminal, wherein a request for establishing said call is received from said calling terminal said network node being arranged for retrieving tariff information from a stored connection table, wherein said tariff information is provided based on locations of said calling terminal and said called terminal;
   for retrieving from said stored connection table account, the account information identifying which of a plurality of accounts is to be charged for the call, the plurality of accounts including:
      a prepaid account of one of a first party associated with said called terminal and a second party associated with said calling terminal,
      a postpaid account of one of said first and second parties, and
      a postpaid account of a third party other than the first and second parties,
   wherein said called and calling terminals are subscribers of a Route to Mobile service (RTMS) and said account information depends on whether said called and calling terminals belong to a same group of RTMS subscribers, and
   for establishing said call utilizing said tariff and account information,
   wherein, when the RTMS is triggered based on parameters in a HLR, said call is established using a hunting list, said hunting list comprising one or more destination addresses to which said call can be set up and a priority indicator for each of said one or more destination addresses, and
   wherein when the RTMS is not triggered, said call is established in a direct connection with the called terminal.

9. The network node according to claim 8, wherein said network node is a network node in an intelligent network.

10. The network node according to claim 8, wherein said connection table is stored in said network node and wherein said tariff information depends on whether said calling terminal and said called terminal belong to a same group of RTMS subscribers.

11. The network node according to claim 8, wherein said connection table comprises an RTMS group identification and an announcement indicator associated with said called terminal, and said network node is further arranged to send a message to said called terminal prior to call establishment based on said announcement indicator.

12. The network node according to claim 8, wherein said network node is arranged
   for determining a first region class for said calling terminal and a second region class for said called terminal, said first region class being associated with a location of said calling terminal and said second region class being associated with a location of said called terminal and
   for determining a rating category for said call to be set up, using said first region class and said second region class, for retrieving said tariff information from said stored connection table.

13. The network node according to claim 12, wherein said connection table of said call comprises rating categories for different combinations of first region classes and second region classes.

14. The network node according to claim 8, wherein said network node is further arranged for charging a calling party associated with said calling terminal for roaming costs of said called terminal.

15. The network node according to claim 8, wherein said network node is further arranged to send a message to said calling terminal requesting a payment option for said call to be set up to said called terminal, if said account information identifies the account of said called terminal as a prepaid account.

16. The network node according to claim 8, wherein said network node is further arranged to interface with a billing service in said telecommunication network and to transmit said rating category to said billing service.

17. The network node according to claim 8, wherein said network node is further arranged to apply a set of rules to said tariff information obtained from said stored connection table.

18. The method according to claim 1, wherein said tariff information in said stored connection table includes at least three tariff levels.

\* \* \* \* \*

UNITED STATES PATENT AND TRADEMARK OFFICE
CERTIFICATE OF CORRECTION

PATENT NO.       : 8,918,076 B2                                    Page 1 of 1
APPLICATION NO.  : 13/123579
DATED            : December 23, 2014
INVENTOR(S)      : Bot It is certified that error appears in the above-identified patent and that said Letters Patent is hereby corrected as shown below:

Specification

In Column 1, Line 8, delete "terminal. in" and insert -- terminal. In --, therefor.

In Column 1, Line 13, delete "W02008/054194" and insert -- WO2008/054194 --, therefor.

In Column 1, Line 22, delete "W02008/054218" and insert -- WO2008/054218 --, therefor.

Claims

In Column 15, Line 15, in Claim 12, delete "arranged" and insert -- arranged: --, therefor.

In Column 15, Line 21, in Claim 12, delete "terminal and" and insert -- terminal; and --, therefor.

Signed and Sealed this
Seventeenth Day of May, 2016

Michelle K. Lee
*Director of the United States Patent and Trademark Office*